United States Patent [19]

Powell

[11] Patent Number: 4,618,390

[45] Date of Patent: Oct. 21, 1986

[54] METHOD FOR PREPARING LAMINATED ARTICLES

[75] Inventor: Clois E. Powell, Westerville, Ohio

[73] Assignee: Ashland Oil, Inc., Ashland, Ky.

[21] Appl. No.: 689,641

[22] Filed: Aug. 14, 1984

Related U.S. Application Data

[63] Continuation-in-part of Ser. No. 504,027, Jun. 13, 1983, abandoned.

[51] Int. Cl.$^4$ ................................................ C09J 5/02
[52] U.S. Cl. ............................ 156/307.3; 156/331.4; 156/332; 428/424.6; 524/558; 524/591
[58] Field of Search ................ 156/307.3, 331.4, 332; 524/558, 591; 428/424.6

[56] References Cited

U.S. PATENT DOCUMENTS

| | | | |
|---|---|---|---|
| 3,028,367 | 4/1962 | O'Brien | 525/118 |
| 3,108,986 | 10/1963 | Goldberg et al. | 428/424.6 |
| 3,632,789 | 1/1972 | Wilhelm | 524/315 |
| 3,681,289 | 8/1972 | Kruse | 525/127 |
| 3,931,088 | 1/1976 | Sakurada et al. | 524/501 |
| 3,994,764 | 11/1976 | Wolinski | 156/218 |
| 4,119,602 | 10/1978 | Isgur et al. | 528/45 |
| 4,215,023 | 7/1980 | Strolle | 260/22 CB |
| 4,259,408 | 3/1981 | Moschter | 428/424.6 |
| 4,268,641 | 5/1981 | Koenig et al. | 525/367 |
| 4,280,979 | 7/1981 | Dunleavy et al. | 264/157 |
| 4,295,910 | 10/1981 | Cooley et al. | 156/314 |
| 4,433,095 | 2/1984 | Hombach et al. | 524/591 |

*Primary Examiner*—John J. Gallagher
*Attorney, Agent, or Firm*—M. E. Picken

[57] ABSTRACT

A method of bonding a flexible substrate; e.g., vinyl, cloth, paper, etc., to a rigid wood substrate. The method comprises consolidating the two substrates through the medium of a curable adhesive composition consisting essentially of an aqueous emulsion of a butyl acrylate-methyl methacrylate-2-hydroxyethyl acrylate terpolymer adjusted to pH 9 to pH 10 with 2-amino-2-methylpropanol, polypropylene glycol, an acrylamide-acrylic acid copolymer thickener, containing a dispersed polyisocyanate hardening agent. Decorative vinyl/wood laminates for use in mobile home construction can be advantageously prepared in this manner.

14 Claims, No Drawings

METHOD FOR PREPARING LAMINATED ARTICLES

This application is a continuation-in-part of application Ser. No. 06/504,027 of June 13, 1983, now abandoned.

BACKGROUND OF THE INVENTION

DESCRIPTION OF THE PRIOR ART

Thermosetting resins in the form of condensates of a phenol or urea with formaldehyde have heretofore enjoyed widespread utility as adhesives in wood bonding applications for the construction industry. These adhesives in general exhibit excellent strength properties as well as good durability and water resistance. The disadvantages attendant to their use are essentially environmentally concerned. The indicated adhesive resins are utilized as an organic solvent solution in a manner whereby it is not feasible to recover the hydrocarbon solvent in the eventual curing or consolidation process. While such adhesives are generally cured at a relatively moderate elevated temperature, free formaldehyde is nonetheless generated in the curing process thus posing potential health problems for workers. These resins require costly and inconvenient heat curing. When cured they may not be sufficiently durable for exterior applications. This deficiency is in part due to their susceptibility to ultraviolet degradation.

Most recently a new area of adhesive technology based on urethane chemistry has been developed which obviates the indicated disadvantage associated with the aforementioned prior art compositions. The new adhesives are water-borne compositions in which the curable resinous matrix is essentially composed of a polyisocyanate and polyvinyl alcohol. Optionally, colloidally dispersed SBR and vinyl acetate-ethylene copolymers can be included in the compositions for enhancing adhesive properties. Beyond exhibiting adhesive strength properties and water resistance comparable to the phenolic adhesives, reduced brittleness of the resultant cured adhesive and better resistance to discoloration represent improved properties to be gained in their use. Moreover, they can be conveniently cured at ambient temperature as low as 10° C. U.S. Pat. No. 3,931,088 is directed to adhesive compositions of this type.

As mentioned, the indicated prior art adhesives provide excellent bonding in wood-to-wood applications. However, in specialty applications wherein a flexible substrate, e.g., plastic sheeting or film is bonded to wood, the degree of adhesiveness at the plastic interface exhibited by such compositions is less than desired. It is, accordingly, the object of this invention to ameliorate this deficiency of the relevant prior art adhesives.

SUMMARY OF THE INVENTION

In accordance with the present invention a method is provided for effectively bonding a flexible substrate, particularly one devoid of fibrous structural characteristics, to a rigid wood substrate. The method comprises consolidating the disparate substrates under mild to moderate conditions of temperature and pressure through the medium of a water-borne reactable adhesive composition. The contemplated adhesives consist of an aqueous emulsion of a butyl acrylate-methylmethacrylate-hydroxy-ethylacrylate terpolymer, a polyalkylene glycol and a thickener containing a hardening agent in the form of a dispersed protected polyisocyanate. A protected polyisocyanate in the context of this invention consists of a hydrophobic solvent solution of the isocyanate.

The method of this invention is equally suited for hot assembly line and cold assembly line applications which customarily require entirely different adhesive formulations. The hot assembly line adhesive is commonly a solvent-based urethane system which cannot ordinarily be adapted to cold assembly lines since solvent-based urethanes will cause raising of the wood grain on particle board substrates. The cold assembly line adhesive for a vinyl to particle board laminate is typically a cumbersome two-part epoxy adhesive.

Past attempts to prepare a one-pot adhesive for laminating vinyl films to particle board for a one-step or single-pass application have been less than successful. U.S. Pat. No. 4,295,910 describes such an effort to use a single application of a vinyl acetate-ethylene copolymer emulsion in admixture with polyisocyanate and organic solvent. Although a permanently bonded vinyl film/particle board laminate resulted, the polyisocyanate, vinyl acetate-ethylene emulsion adhesive mixture was found to be very reactive, difficult to handle and unsuitable for use in continuous lamination processes. These problems were overcome in that instance by separately applying the components of the adhesive in a two-step process. The method of this invention provides one adhesive adaptable to both hot and cold assembly lines, an adhesive having a pot life or workable life of at least one hour, an adhesive which lacks the disadvantages of the prior art systems.

DESCRIPTION OF THE PREFERRED EMBODIMENTS

This invention is a method for laminating a flexible substrate and a rigid substrate which comprises: (I) consolidating said substrates through an adhesive medium having a pot life of at least one hour consisting essentially of: (A) a colloidal aqueous dispersion of a hydroxyl functional acrylic polymer; (B) a polyalkylene glycol; (C) a thickener to permit dispersion of hardener, control of processing characteristics, and control of penetration into wood substrates; (D) a dispersed organic solution of polyisocyanate hardener; and (II) effecting the cure of said adhesive at ambient or elevated temperature.

In one embodiment said consolidating step comprises a single application of said adhesive medium to said substrates and said cure effecting step is at ambient temperature and said thickener is an acrylamide-acrylic acid polymeric thickener or a neutralized acrylic acid polymeric thickener.

The adhesive of this invention comprises a colloidal aqueous dispersion of an acrylic polymer latex having hydroxyl functionality, a polyalkylene glycol, a thickener and a dispersed organic solution of polyisocyanate hardener.

The polymer latex having hydroxyl functionality attached to the polymer backbone is obtained by copolymerizing hydroxyl functional monomers such as 2-hydroxyl ethyl acrylate or 2-hydroxyl propyl acrylate with suitable monomers or by hydrolyzing suitable esters that have been copolymerized to form polyvinyl acetate, vinyl acetate-ethylene copolymer, vinyl acetate-acrylic copolymer, acrylic copolymer, polystyrene, styrene-acrylic copolymer, nitrile rubber, polychoroprene or polyurethane latex.

The preferred polymer latex having hydroxyl functionality is the butyl acrylate—methyl methacrylate-2 hydroxyethyl acrylate terpolymer.

Details with respect to the preparation of the aqueous emulsions of the terpolymers useful in the practice of this invention can be found in the working examples to follow. These emulsions have a non-volatile avoirdupois content of between about 55 and 65%. When prepared as described in the example, having the indicated solids content, the viscosity properties exhibited by the contemplated compositions are suitable as such for application purposes. Although not specifically illustrated herein, other latices, notably SBR or acrylic latex can be blended in a small amount for the purpose of minorly modifying relevant physical properties of the resultant adhesive composition such as glass transition temperature, viscosity, etc.

The polyol component of this adhesive, a polyalkylene glycol, is the second important compound. It has been found that this polyol initially functions in the adhesive as a plasticizer but subsequently reacts with the polyisocyanate component, ultimately resulting in removal of the initial plasticizing effect. Both secondary hydroxyl containing polyols such as polypropylene glycol and primary hydroxyl containing polyols such as polyethylene glycol are useful in this adhesive. The preferred polyalkylene glycol in the adhesive of this invention is polypropylene glycol having a molecular weight of about 200. Provision of hydroxyl functionality in this polyol component in addition to and separate from the hydroxyl functionality of the terpolymer latex, provides superior adhesive characteristics in the first hours after application to the vinyl-particle board substrates. Among these superior initial properties are improved wet out, green tack, and drying speed. Improved fiber pull and decreased foaming are other advantages.

The "Wet Out" of an adhesive relates to the ability of the adhesive to smoothly spread to the entire surface of the particle board so that after the vinyl has been laminated to the board an attempt to separate the vinyl from the board shows that the adhesive completely covers the entire inner surface of the vinyl. Poor "wet out" is incomplete coverage which results in inadequate final physical properties. Good "wet out" is complete coverage of the vinyl inner surface as observed by peeling back the vinyl immediately after lamination.

"Green tack" is the measure of the strength of the bond between vinyl and particle board immediately after lamination. "Fiber pull" is observed when strands of wood are removed from the particle board substrate on separation of the vinyl layer. In order to function properly in modern assembly line production, an adhesive must meet all the aforementioned tests positively. A single failure is fatal to assembly line performance, where, for example, laminated boards must be stacked or cut immediately.

Foaming of the adhesive during application is an undesirable characteristic because, in addition to the apparent inconvenience, defects in adhesion occur due to voids created by bubbles. Foaming of the adhesive creates poor wet out and poor green tack.

Peel strength is measured after about 8 days aging and is the test of final properties of the adhered laminate. Usually five measurements are made, the result reported being an average value. Differences of the order of 0.5 lb/in may be significant in finding one adhesive superior in performance to another adhesive.

The third component of the adhesive is a thickener to permit dispersion of hardener, control of processing characteristics and control of penetration into wood substrates. Use of thickener permits application in one rather than two steps in an assembly line. The preferred thickener is an acrylamide-acrylic acid copolymer thickener. The polymeric thickener used in the process of this invention is a liquid copolymer of acrylamide and acrylic acid manufactured by Nalco Chemical Company, Oak Brook, Ill. This polymeric thickener, Nalco 9SS-068, is described by the manufacturer as having a specific gravity of 1.072, a density of 8.93 lbs./gallon, a 130° F. flash point, 33.4% solids by weight and a Brookfield viscosity of 740 measured with a #3 spindle at 60 rpm and 72° F.

The hardening agent (or "polyisocyanate hardener" or "crosslinker") useful in preparing the adhesive compositions of this invention include a variety of compounds or oligomers containing at least two isocyanate groups. Particularly representative of these applicable polyisocyanate compounds are: toluene diisocyanate (TDI), xylene diisocyanate (XDI) and hexamethylene diisocyanate (HMDI). Likewise, the hydrogenated derivatives of said aromatic diisocyanates are particularly suited for certain applications where the light resistance of the adhesive film is important. Diphenylmethane diisocyanate (MDI) and the various polymeric analogs thereof (polymeric MDI) are especially preferred in preparing the adhesive compositions herein. These materials are particularly desirable for this purpose because of the low toxicity properties associated therewith. Additionally useful in the practice of this invention are the various polyester diisocyanates and the prepolymers obtained by capping a diol or other polyols with a diisocyanate compound.

The indicated isocyanate hardening agents are employed in the form of a protected isocyanate. A protected isocyanate is defined as a polyisocyanate dissolved in a hydrophobic solvent. The advantage of using the polyisocyanate in its protected form is that the reaction between the isocyanate and water when combined with the aforementioned emulsions is minimal. Thus, on the absorption of the water by the wood substrate in the bonding mechanism, free isocyanate groups are available to react with suitable active hydrogen-containing groups present in the composition and/or the substrate. Representative solvents useful for this purpose are such as toluene, xylene, various chlorinated hydrocarbons such as 1,1,1-trichloroethane and the various phthalate, etc. Particularly preferred solvents are the phthalate esters which serve to impart flexibility to the cured adhesive compositions by remaining as a plasticizer. The protected polyisocyanates consist essentially of from about 70 to 90 parts by weight of the isocyanate and correspondingly from 30 to 10 parts of the solvent. As previously mentioned, where the solvent component is a phthalate ester, it may be desirable to utilize more of the solvent for the purpose of enhancing the plasticizing effect. The protected isocyanate may optionally include a surfactant to aid in dispersing this component in the terpolymer emulsion.

The hardening agent, i.e., the protected polyisocyanate is combined with the terpolymer emulsion to provide an adhesive composition containing from 80 to 99 parts by weight of the terpolymer and correspondingly from 20 to 1 parts of the polyisocyanate. A more preferred combining ratio is from 85 to 95 parts by weight of the terpolymer and correspondingly from 15 to 5 parts of the polyisocyanate. Temperature curing conditions range from ambient to about 90° C., and more preferably from 20° to 50° C.

In formulating the adhesive compositions useful in the practice of this invention various other optional components can be incorporated. These optional components include fillers and reinforcing agents; emulsion thickeners such as an adjuvant amount of polyvinyl alcohol; curing catalysts as for example tertiary amines; surfactant or wetting-promoting agents; plasticizers; tackifying agents; etc.

In one embodiment this invention is a method for laminating a flexible substrate and a rigid substrate which comprises consolidating a flexible and rigid substrate through an adhesive medium having a pot life of at least one hour consisting essentially of (A) a colloidal aqueous dispersion of a butyl acrylate-methyl methacrylate-2-hydroxy ethyl acrylate terpolymer, (B) a polyalkylene glycol, (C) a thickener to permit dispersion of hardener, control of processing characteristics, and control of penetration into wood substrates, (D) a dispersed organic solution of polyisocyanate hardener and effecting the cure of said adhesive at ambient or elevated temperatures.

In another embodiment, the polyalkylene glycol is tripolypropylene glycol, the colloidal aqueous dispersion of terpolymer is adjusted to pH 9 to pH 10 with 2-amino-2-methyl propanol and the thickener is an acrylamide - acrylic acid copolymer thickener.

Suitable substrates for lamination with the adhesive of this invention may be fibrous, non-fibrous, porous and non-porous, metallic and non-metallic, polymeric, leather, cork, wood and glass. The preferred rigid substrate in the practice of this invention is particle board. Among the flexible substrates are paper, cloth and vinyl films. Vinyl films which can be utilized in the present invention include cast, calendered and extruded vinyl films. Suitable vinyl films include polyvinyl chloride, copolymers of vinyl chloride, such as vinyl chloride-vinyl acetate copolymers, polyvinyl fluoride, polyvinyl formal, polyvinylidene chloride, polyvinyl butyral, polyvinylidene fluoride, and the like. The preferred vinyl film for use in the present invention is a polyvinyl chloride film. Vinyl films of any thickness may be used in the present invention, however, preferred are those having a thickness between 1 and about 6 mils, most preferably, about 2 mils.

In order to further illustrate the manner in which the present invention can be implemented, the following working examples are given. All parts and percentages referred to therein are by weight unless otherwise indicated.

EXAMPLE I: Adhesive with Polyalkylene Glycol

The 65% solids terpolymer latex was prepared by adding 19.0 grams Aerosol TR-70 surfactant (American Cyanamid, Wayne, N.J.) to 829 grams water in a 3 neck 5 liter Morton flask. Ammonium carbonate buffer in the amount of 0.93 grams was added while heating to 78° C. and sparging with nitrogen. Butyl acrylate monomer in the amount of 11.4 grams and methyl methacrylate monomer in the amount of 26.6 grams were added; the nitrogen sparge was discontinued. Ammonium persulfate in the amount of 3.8 grams was added. Over a total feed time of 3½ hours a total of 1180 grams butyl acrylate, 662.3 grams methyl methacrylate and 57 grams 2-hydroxy ethylacrylate were added. Ammonium persulfate in the amount of 3.8 grams in 171 grams water was added over 4 hours. Tertiary butyl hydroperoxide in the amount of 0.19 grams was added. Sodium formaldehyde sulfoxylate in the amount of 0.19 grams was added and the temperature held at 78° C. for one hour. The contents of the flask was cooled to 30° C. and filtered through a 200 mesh screen.

The adhesive was formulated by blending 100 parts of the terpolymer latex prepared according to the above method and adjusted to pH 9 to pH 10 with AMP-95 (2-amino-2-methyl-propanol) with: 1.8 parts tripolypropylene glycol (Dow, Midland, Mich.), 0.5 parts polymeric thickener (Nalco 9SS - 068) (Nalco, Oak Brook, Ill.), N-methyl-2-pyrrolidone (5.3 parts), methyl amyl ketone (2.1 parts) and Aerosol TR-70 sulfosuccinate surfactant (1.1 parts). The blended adhesive was allowed to age overnight. Immediately prior to use, crosslinker in the amount of 11.57 parts was added. The crosslinker is 75 parts polymeric methylene-bis-disphenyl isocyanate and 25 parts toluene-dibutyl phthalate.

EXAMPLE 2: Adhesive Without Polyol

In order to demonstrate the criticality of the polyalkylene glycol component in the adhesive of this application, an adhesive was prepared according to the procedure of Example 1 with the single difference being omission of tripolypropylene glycol.

EXAMPLE 3: Adhesive With Different Polyol

This example illustrates the use of a hydroxyl containing compound suggested in U.S. Pat. No. 3,931,088 where polyoxyethylene alkyl ethers, polyoxyethylene alkyl phenol ethers and oxyethylene-oxypropylene block copolymers are mentioned as useful in the polymerization process. One of the polyoxyethylene alkyl phenol ethers, octyl phenoxypolyethoxy ethanol was selected for testing. According to Rohm and Haas, Philadelphia, Pa., Triton X-100 is octyl phenoxypolyethoxy ethanol a polyoxyethylene alkyl phenol ether having a molecular weight of 628 grams/mole. Although U.S. Pat. No. 3,931,088 suggests its use during polymerization and not during adhesive formulation Triton X-100 was tested as a polyalkylene glycol replacement in the formulation. The adhesive of Example 3 was prepared according to the procedure of Example 1 with the single change being the replacement of the polyalkylene glycol (tripoly propylene glycol) with an equivalent amount of Triton X-100. Triton X-100 in the amount of 5.3 g was added to 100 grams terpolymer latex. The other compounds were added in the quantities recited in Example 1.

Test Procedure

The samples of adhesive were drawn down on particle board with a number 30 wire wound rod. Within 3 to 5 minutes 6 mil vinyl (Borden Chemical, Columbus, Ohio) was laminated onto the board with a 4.5 pound roller. Visual observations of wet out, green tack, drying speed and foam were recorded immediately. Peel strengths were measured and recorded after 8 days of aging. Peel values were measured on an Instron machine, evaluating peel strength of 180° using a crosshead speed of 12 inches per minute (Pressure Sensitive Adhesive Test Council Test Number 1).

TABLE 1

Initial Properties

| Adhesive | Wet Out | Green Tack | Drying Speed | Fiber Pull | Foam | Peel Strength (8 days) lbs/in. Average of 5 tests Standard Deviation of 5 tests |
|---|---|---|---|---|---|---|
| Example 1 polyalkylene glycol | good | good | fast | 30 min. | None | 8.7 (0.3) |
| Example 2 omit polyol | poor | good | fast | 45 min | 10% | 8.2 (0.7) |
| Example 3 Triton X | good | poor | slow | None in 3 hrs. | 200% | 8.8 (0 3) |

The adhesive of Example 1, containing the polyalkylene glycol (tripoly propylene glycol) meets all the initial and final physical tests. The adhesive of Example 2, in which polyol was omitted, failed the wet out test and showed slower fiber pull and poorer peel strength. The foaming may have contributed to all three physical deficiencies. The adhesive of Example 3, containing a substitute polyol, although showing good final peel strength, showed poor green tack, slow drying speed, considerable foam and no fiber pull. These defects would be fatal to assembly line usage.

EXAMPLE 4: Thickener

This Example serves to illustrate the process of the invention using the adhesive of Example 1 to laminate 2 mil vinyl to particle board (Board 10). For comparison, the adhesive used on Board Number One was prepared without thickener. The adhesive was applied using a roll coater set to apply a 2 mil thick wet coating to 0.75 inch thick particle board at a feed speed of 30 in/min (75 cm/min) to which a 6 mil thick vinyl laminate was applied. The roll temperature was 150° F. (65.6° C.), the oven temperature was 150° F. (65.6° C.).

Comparative results are reported in Table 2 (use of thickener). In order to use a single application of adhesive, the thickener is a critical component.

TABLE 2

| | Thickener | Applications Needed | Peel Value (Standard Deviation of 5 tests) lbs/in. |
|---|---|---|---|
| Board 1 | none | Two | 5.4 (0.3) |
| Board 10 | 0.50 parts/ 100 parts terpolymer latex | One | 4.5 (0.1) |

EXAMPLE 5

This Example serves to illustrate the process of this invention using the adhesive to laminate 2 mil or 6 mil thick vinyl to particle board with a single application and effecting the cure at ambient temperature. Thickener was used at three different levels in the adhesive of Example 1. Visual observations and peel values are recorded in Table 3. Peel values are measured on an Instron machine. Peel strength was evaluated at 180° using a crosshead speed of 12 inches per minute [Pressure Sensitive Adhesive Test Council Test Number 1].

TABLE 3

| Board | Thickener parts/ 100 parts Terpolymer Latex | Vinyl Thickness | Applications | Observation/ Peel Value (Standard Deviation of 5 Tests) lbs/in. |
|---|---|---|---|---|
| 3 | 0.15 parts | 6 mil | two | 6.1(0.4) |
| 5 | 0.30 parts | 2 mil | one | no grain raise could not remove vinyl from the board |
| 8 | 0.50 parts | 2 mil | one | could not remove vinyl from the board |

EXAMPLE 6: pH Adjustment

When particle board is a substrate, there can be a grain raising problem with certain adhesives. When this occurs, the final product has an uneven, bumpy appearance instead of the desired smooth surface. This is necessarily a reason to reject the laminate wherever appearance is important as it is in most uses; for example, when the laminate is used in bookcases or stereo component storage pieces. This example illustrates the importance of using a reactive compound such as 2-amino-2-methyl-propanol (AMP) to adjust the pH of the adhesive. The adhesive was prepared according to Example 1 with the single difference being the use of KOH instead of AMP ro adjust the pH to 9 to 10. Where KOH was used instead of AMP to adjust pH, grain raising problems were encountered as shown in Table 4.

TABLE 4 pH Adjustment

| | pH Adjustment | Result | Peel Value (Standard Deviation of 5 tests) lbs/in. |
|---|---|---|---|
| Board 10 | AMP | No Grain Raising | 4.5(0.1) |
| Board 12 | KOH | Severe Grain Raising | 5.5(0.5) |
| Board 13 | KOH | Some Grain Raising | 3.0(0.2) |

EXAMPLE 7

Further characterization of the latex portion of the adhesive formulation focused on the glass transition temperature (hereinafter Tg) of the latex. Several acrylic latices were synthesized and formulated into the adhesives of this invention.

The different Tg latices are set forth below in Table 5.

TABLE 5

Glass Transition of Latex

| Latex No. | Latex BA | Monomer MMA | Content (*PPHM) HEA | Tg (°C.) |
|---|---|---|---|---|
| 38A | 71.3 | 24.7 | 7.4 | −27 |
| 38B | 63.1 | 32.9 | 4.0 | −17 |
| 80A | 62.1 | 34.9 | 3 | −15 |
| 80B | 59.8 | 37.2 | 3 | −12 |
| 70 | 55.4 | 40.6 | 4 | −7 |

TABLE 5-continued

| Latex No. | Latex BA | Glass Transition of Latex Monomer MMA | Content (*PPHM) HEA | Tg (°C.) |
|---|---|---|---|---|
| 67 | 51.8 | 44.2 | 4 | −2 |

*PPHM is weight parts per hundred weights parts monomer.
BA is butyl acrylate
MMA is methylmethacrylate
HEA is 2-hydroxy ethylacrylate These 65% latices were formulated into adhesive compositions according to the procedure of Example 1 using the various listed polyalkylene glycols; adhesive peel strengths were measured according to the test procedure of Example 1 and recorded in Table 6.

TABLE 6

| Latex Tg (°C.) | Polyalkylene Glycol | Peel Strength lbs/in. |
|---|---|---|
| −27 | Polyethylene glycol 300 MW | 1.6 |
| −27 | Polyethylene glycol 400 MW | 1.0 |
| −17 | Polyethylene glycol 300 MW | 1.1 |
| −17 | Polyethylene glycol 400 MW | 1.2 |
| −15 | Triethylene glycol | 5.6 |
| −15 | Tripropylene glycol | 7.5 |
| −12 | Triethylene glycol | 5.7 |
| −12 | Tripropylene glycol | 7.1 |
| −7 | Tripolyethylene glycol | 3.2 |
| −7 | Dipolyethylene glycol | 3.3 |
| −2 | Tripolyethylene glycol | 2.1 |
| −2 | Dipolyethylene glycol | 1.2 |

The above tabulated results reveal that the preferred latex achieved optimum performance characteristics at a Tg above −27° and below −2°. The preferred performance characteristics were at a Tg between −17° and −7°. The most preferred characteristics were at a Tg of −15°.

EXAMPLE 8

Further development of alternative latices having hydroxyl functionality focused on preparation of additional polymer latices. According to the procedure of Example 1 butyl acrylate/styrene/2-hydroxy ethylacrylate (BA/S/HEA) and ethyl hexyl acrylate/methyl methacrylate/2-hydroxy ethyl acrylate (EHA/MMA/HEA) were prepared.

The adhesives were formulated by blending 100 parts of the polymer latices with: 1 part Tamol 731 brand of sodium salt of a carboxylate polyelectrolyte pigment dispersant pH 10.0 25% solids by weight density (25° C.) 9.2#/gal. Rohm and Haas, Philadelphia, Pa.; 1.8 parts tripoly propylene glycol (Dow, Midland, Mich.); 0.8 parts neutralized acrylic acid polymeric thickener AMSCO RES 6038 Union Chemical, San Francisco, Calif.; N-methyl-2-pyrrolidone (5.3 parts), methyl amyl ketone (2.1 parts) and Aerosol TR-70 sulfosuccinate surfactant (1.1 parts). The blended adhesive was allowed to age overnight. Immediately prior to use, crosslinker in the amount of 4.0 parts was added. The crosslinker is 75 parts polymeric methylene-bis-disphenyl isocyanate, 12.5 parts toluene-dibutyl phthalate and 12.5 parts toluene.

The BA/MMA/HEA latex of Example 1 was reprepared at differing particle sizes by adjusting downward the buffer level in the synthesis to produce smaller particles ranging from less than 14,000 Angstroms to over 7,000 Angstroms.

The latex is also usefully prepared from butyl acrylate, methyl methacrylate and N-methylol acrylamide or from butyl acrylate, methyl methacrylate, styrene and 2-hydroxy ethylacrylate.

Table 7 reports the results of this testing which was carried out according to the test procedures described hereinabove following Example 3.

In a "cold line" the adhesive is applied by a roll coaster to the particle board or web coated to the vinyl. The adhesive is not dried in an oven (hence the source of the word cold). The vinyl and board is laminated under pressure. The vinyl is sometimes passed over a heated roller before lamination to the board, however "cold line" generally means that all events of the laminating occur at ambient temperature. The boards are stacked to allow the adhesive to set and then they are processed.

In a "hot line" the adhesive is applied to the particle board and then dried in an oven (hence, the source of the word hot). The board is sometimes coated again with adhesive and dried again. The vinyl is then pressed onto the board for lamination. The vinyl can be passed over a heated roller before lamination. The vinyl is trimmed and sanded as the board exits the press and is immediately prepared for shipment to the customer.

"Grain raise" occurs when the fibers of the particle board swell to the point that one can see the swollen fibers through the vinyl.

Visual observations and peel values obtained when the Example 7 latices were tested in the example adhesive formulation are reported in Table 7 below.

"Tracking" occurs when a pattern from the application of the adhesive is apparent through the vinyl. However, no tracking was observed with any of the tested adhesive formulations prepared from the several Example 8 latices.

"Vinyl failure" occurs when vinyl tears and some vinyl remains with the board when the vinyl is stripped from the board. Vinyl failure occurred only with the adhesive prepared using the EHA/MMA/2-HEA polymer latex.

TABLE 7

Comparison of Several Hydroxyl-Functional Latices

| Polymer Composition | Particle Size Angstroms | Adhesive Line Conditions # Applications | Wet Out | Observations Fiber Pull | Grain Raise | Peel Value (SDev) |
|---|---|---|---|---|---|---|
| BA/MMA/2-HEA | 13,681 | 2 Hot | poor | fair | some | 2.5(0.7) |
| 62/35/3 | 7,016 | 1 Hot | fair | aver. | some | 5.1(0.6) |
|  | 7,016 | 2 Hot | fair | aver. | some | 4.1(0.3) |
|  | 7,632 | 1 Cold | good | aver. | some | 5.9(0.5) |
|  | 7,632 | 1 Cold | good | aver. | some | 5.9(0.4) |
| BA/S/2-HEA | 8,336 | 1 Hot | poor | some | some | 2.9(0.8) |
| 62/33/3 | 8,336 | 2 Hot | poor | deep | little | 4.6(0.6) |
| EHA/MMA/2-HEA | 8,848 | 2 Hot | poor | some | moderate | 2.5(0.7) |
| 44/52/3 | 8,848 | 2 Hot | poor | fair | some | 3.4(0.5) |

The adhesive of this invention is shown to be useful when the hydroxyl functionality provided by the hydroxy ethyl acrylate monomer is combined with any of several different unsaturated monomers in the preparation of the latex.

The latex particle size is shown to be important; better adhesive quality being obtained when the average particle size is less than about 15,000 Angstroms. The preferred adhesive being prepared from a latex having an average particle size less than about 10,000 Angstroms. The most preferred acrylic polymer has a particle size from 7,000 Angstroms to 14,000 Angstroms.

I claim:

1. A method for laminating a flexible substrate and a rigid wood substrate which comprises:
   (I) consolidating said substrates through an adhesive medium having a pot life of at least one hour consisting essentially of:
      (a) a colloidal aqueous dispersion of a hydroxyl functional acrylic polymer;
      (b) a polyalkylene glycol;
      (c) a thickener to permit dispersion of hardener, control of processing characteristics, and control of penetration into wood substrates;
      (d) a dispersed organic solution of protected polyisocyanate hardener in hydrophobic solvent; and
      (e) water; and
   (II) effecting the cure of said adhesive at ambient or elevated temperature.

2. The method in accordance with claim 1 wherein said hydroxyl functional acrylic polymer is a butyl acrylate-methylmethacrylate-2-hydroxyethyl acrylate polymer, a butyl acrylate-styrene-2-hydroxy ethyl acrylate polymer, or an ethyl/hexylacrylate-methyl methacrylate-2-hydroxy ethylacrylate polymer.

3. The method in accordance with claim 1 wherein said consolidating step comprises a single application of said adhesive medium to said substrates and said cure effecting step is at ambient temperature.

4. The method in accordance with claim 1 wherein said acrylic polymer glass transition temperature is above $-27°$ C. and below $-2°$ C.

5. The method in accordance with claim 1 wherein said colloidal aqueous dispersion of hydroxyl functional acrylic polymer has an average particle size from 7,000 Angstroms to 14,000 Angstroms.

6. The method in accordance with claim 2 wherein said acrylic polymer is butylacrylate, methylmethacrylate and 2-hydroxy ethylacrylate and said polyalkylene glycol is tripolypropylene glycol.

7. The method in accordance with claim 1 wherein said thickener is an acrylamide-acrylic acid polymeric thickener or a neutralized acrylic acid polymeric thickener.

8. The method in accordance with claim 1 wherein the polymer and polyisocyanate are present in said adhesive medium in a weight ratio of from 80:20 to 99:1, respectively.

9. The method in accordance with claim 1 wherein the polymer and polyisocyanate are present in said adhesive medium in a weight ratio of from 85:15 to 95:5, respectively.

10. The method in accordance with claim 1 wherein said organic solution of a polyisocyanate consists essentially of from 70–90 parts by weight of the isocyanate and correspondingly from 30 to 10 parts of solvent.

11. The method in accordance with claim 1 wherein said organic solution is toluene and dibutyl phthalate.

12. The method in accordance with claim 11 wherein said organic solution is 50 parts toluene and 50 parts dibutyl phthalate.

13. The method in accordance with claim 1 wherein said polyisocyanate is polymeric methylene-bisdiphenyl-isocyanate.

14. The method in accordance with claim 1 wherein said flexible substrate is polyvinyl chloride.

* * * * *